Patented Mar. 7, 1944

2,343,559

UNITED STATES PATENT OFFICE 2,343,559

PROCESS OF RECLAIMING WASTE POLYCHLOROPRENES

Walter G. Kirby and Leo E. Steinle, Naugatuck, Conn., assignors to United States Rubber Company, New York, N. Y., a corporation of New Jersey No Drawing. Application January 16, 1942, Serial No. 427,024

17 Claims. (Cl. 260—9)

This invention relates to a process of reclaiming elastic polymerized chloro-2-butadiene-1,3 in its various forms, hereinafter referred to for convenience as polychloroprene, and also the reclaimed product.

Plastic polymerized chloroprene in various forms and containing certain modifying and stabilizing agents is sold under the name of neoprene in a number of types such as E, M, G, GN, I, etc. Neoprene GN, an outstanding material, is understood to be prepared by polymerization of chloroprene in the presence of sulphur. Neoprene I is understood to be prepared by polymerization of chloroprene and a portion of an unsaturated nitrile in the present of sulphur. When these various types of neoprene are mixed with selected modifying agents, softeners, fillers, reinforcing agents, etc., in the manner generally known to the art, and said mixtures are subjected to a heating process, the neoprene mixture is converted from a plastic to a touch elastic material by a process generally called curing or vulcanizing. The tough elastic body is referred to as vulcanized neoprene. The vulcanization step may occur at low or high temperatures and may proceed to various degrees. If it takes place at or near room temperature or during processing, it is referred to as "scorching." The neoprene mixtures in which "scorching" has proceeded to even a relatively slight degree cannot be satisfactorily milled, tubed, calendered, or otherwise processed in the industry and so must be scrapped. For convenience "scorched" and fully vulcanized elastic neoprene mixtures or products made from such mixtures will be referred to herein as vulcanized neoprene.

The art of the reclaiming of vulcanized ordinary rubber scrap is well-known. In all of the economical methods for reclaiming scrap rubber, that are in commercial use today, high temperatures are used. These elevated temperatures which range from approximately 300° F. to approximately 400° F. are desirable because they accelerate the reversion of vulcanization and speed up the action of so-called softening agents, and thus contribute to economical plasticization. These higher temperatures are also desirable to accelerate and promote the rapid destruction of fibre where it is present. Because of these facts, equipment that will accommodate these higher temperatures has become standardized and is now in use throughout the rubber reclaiming industry.

Neoprene is different from rubber in that it does not combine with sulphur to bring about vulcanization and does not undergo reversion of vulcanization through the medium of heat, to change it from an elastic to a plastic form. On the contrary when heat and especially the higher temperatures referred to are applied to vulcanized neoprene it becomes harder and is said to be further vulcanized. Therefore, one of the great difficulties in attempting to reclaim scrap vulcanized neoprene is the fact that as the temperature is raised during the process to accelerate the action of oils and softening agents in plasticizing or otherwise breaking down the polymer to a plastic state, there occurs during the same period a gradual further polymerizing and hardening of the neoprene, due to these temperatures, which counteracts any plasticizing effect accomplished. For this reason, processes that have been recommended to date for reclaiming scrap vulcanized neoprene have been limited to low temperatures. At low temperatures it is difficult to get sufficient softening action from softening agents, without using prejudicially excessive amounts.

Since high temperatures will soften ordinary vulcanized rubber scrap and will harden vulcanized neoprene scrap it is apparent that the usual rubber reclaiming methods such as the high temperature digester alkali or digester zinc chloride processes or the high temperature "heater" process cannot be used to reclaim combinations or mixtures of these scraps. This fact has been a source of considerable concern among scrap rubber reclaimers because the introduction of neoprene into rubber articles such as for example an automobile tire having a neoprene tread and a rubber carcass or a rubber gasoline hose having a neoprene inner lining would cause this type scrap to become valueless for further reclaiming use. Also the accidental mixing of neoprene scrap with rubber scrap would destroy the reclaiming value of otherwise high quality vulcanized rubber scrap.

An object of this invention is to provide through the aid of certain reclaiming agents a method of reclaiming scrap vulcanized neoprene at higher temperatures. Another object is to provide a process for reclaiming at one time and in the same vessel mixtures of scrap vulcanized rubber and scrap vulcanized neoprene, as well as to reclaim scrap containing combinations of rubber and neoprene. A further object is to provide a method of reclaiming vulcanized neoprene that will allow use of the same equipment that is regularly used for reclaiming rubber, thus permitting present established rubber reclaiming plants to reclaim this product with no additional cost for equipment. Other objects will be apparent from the following description.

We have discovered that sugars, such as monosaccharoses and polysaccharoses, including disaccharoses, and materials which may be converted into sugars under the conditions of the reclaiming operation, such as starches, will permit reclaiming of scrap vulcanized neoprene by heating the said scrap in a suitable state of subdivision with selected amounts of the reclaiming agent, and optionally with suitable oils, swelling and/or binding agents.

As examples of these reclaiming agents we may mention sucrose, dextrose, maltose, lactose, laevulose, aldohexoses, aldopentoses, ketohexoses, ketopentoses, di and polysaccharides, starches, and the various crude sugar mixtures or solutions such as molasses, sorghum, cane syrup, corn syrup, honey, etc. The above named materials are mentioned merely as examples of the type of compounds that can be employed, and the invention is not to be understood as limited to these examples.

The proportion by weight of our reclaiming agents based on the scrap neoprene may vary depending on their strength, cost and nature of the end product of reclamation desired. Generally from 2 percent to 20 percent by weight of the reclaiming agent may be used. Preferred amounts based on one of the agents such as sucrose may range from 5 to 10 percent.

The following examples are given in illustration of the invention:

Example 1

Scrap vulcanized neoprene is reduced to a desired particle size and placed in an autoclave type vessel commonly known in the rubber reclaiming industry as a digester. The scrap, together with softening oils, water, and our reclaiming agent, is sealed in the digester and heated under pressure. An illustrative batch is as follows:

| | Pounds |
|---|---|
| Scrap vulcanized neoprene | 10,000 |
| Pine oil fraction | 1,000 |
| Rosin oil | 1,000 |
| Our reclaiming agent | Variable |
| Water | 20,000 |

The heating time varies depending on the type of scrap and temperature used, and preferably ranges from three to thirty hours. The temperature usually ranges between about 300° F. and about 420° F. The charge is then washed and dried, following the usual procedure employed for reclaiming rubber, and it is then ready to be refined and further prepared in the mill room for shipment. The final product is fully reclaimed and has a quality comparable to new compounded neoprene.

Example 2

Another procedure is to reduce the scrap vulcanized neoprene to a desired particle size, then place it in an autoclave type vessel, commonly known in the reclaiming industry as a "heater" or "devulcanizer." This process differs from the digester process in that there is usually no agitation and there is practically no water present. The charge under treatment is in a semi-moist state rather than suspended in a solution. The following batch is illustrative:

| | Pounds |
|---|---|
| Scrap vulcanized neoprene | 3,000 |
| Pine oil fraction | 300 |
| Rosin oil | 300 |
| Our reclaiming agent | Variable |
| Water | 120 |

This charge is then sealed in the "heater" and subjected to heat for a desired period. The period of treatment and temperature used will vary with the type of scrap, and the period of time and temperature may be as above specified. The product after the usual milling is fully reclaimed and of a quality comparable to new compounded neoprene.

In order to further illustrate this invention we give the following examples using the previously mentioned digester type equipment.

| | Ex. 3 | Ex. 4 | Ex. 5 | Ex. 6 |
|---|---|---|---|---|
| Scrap vulcanized neoprene | 100 | 100 | 100 | 100 |
| Pine oil fraction | 10 | 10 | 10 | 10 |
| Rosin oil | 10 | 10 | 10 | 10 |
| Water | 200 | 200 | 200 | 200 |
| Corn starch | | 7.5 | | |
| Sucrose | | | 7.5 | |
| Glucose | | | | 15 |
| Viscosity of treated product as shown by a Mooney shearing plastometer | 196 | 33 | 24 | 27 |

Each of the above were treated by loading the charge into a digester and heating with steam for about 16 hours at a temperature of about 365° F.

The effectiveness of a reclaiming operation in recovering scrap vulcanized neoprene may be quantitatively shown by means of an instrument widely used for this purpose in the reclaim rubber industry, namely, the Mooney shearing disc plastometer. This device has been described by M. Mooney in Industrial & Engineering Chemistry, an. ed. 6, 147 (1934). By means of this device the viscosity of a plastic material in shear may be readily and quantitatively measured. Experience has shown that materials with a Mooney viscosity of 50 to 160 when tested at 180° F. can be readily and efficiently processed on standard rubber working machinery, but that materials of a very high viscosity such as 200 and over when tested at 180° F. cannot be so treated.

Example 3 represents a charge in which none of our reclaiming agents are used. The product has a viscosity of 196 and is considered too hard to mill. Examples 4, 5 and 6 represent charges using certain of our reclaiming agents and show that these agents have a definite reclaiming action. In these examples the viscosities range from 24 to 33 and the products can be easily milled and made useful to the rubber trade. In those examples wherein the viscosity is below 50, the reclaiming operation would normally be modified by using less oil, less reclaiming agent, or shorter heating time, or a combination of these changes to give a viscosity in the preferred range. Proper adjustment could easily be made by one experienced in the art to give a product of the desired plasticity.

Very similar reclaiming action will result from our reclaiming agents if used in a "heater" instead of a digester. The treatment in a heater would be carried out the same as the treatment in a digester except that 10 percent of water based on the weight of the scrap would be used instead of 200 percent.

Although for purposes of comparison, our reclaiming agents are used in the above examples with 10 parts of pine oil fraction, and 10 parts of rosin oil, to 100 parts of scrap vulcanized neoprene, it is to be understood that our invention is in no way limited to the use of our reclaiming agents with these oils or proportions of oils. We can use our reclaiming agents both with and without oils, etc.; and the proportions and nature of the oils, swelling agents, penetrants, etc., used with our agents may be varied at will to suit the purposes for which the final reclaimed product is intended. Our agents can further be used with vulcanized neoprene containing all the modifying agents and compounding agents used in the trade in the production of vulcanized neoprene products. For example, magnesia, zinc oxide, other metallic oxides, antioxidants, sulphur, accelerators, retarders, and other ingredients which effect the plasticity, rate of cure and/or physical properties of the vulcanizate; also softeners, fillers and/or reinforcing materials may be used.

The mode of addition of our reclaiming agents is not limited in any way to the foregoing examples. We may add them at any point in the process and they may be added in any desired form, as for example, as a gas or vapor, or as a solid, or a liquid, or in solution in water or organic solvents, or in the oils, softeners, etc., which may also be used in the process.

It is evident from the above that many variations and embodiments of our invention may be made without departing from the spirit or scope thereof.

Having thus described our invention, what we claim and desire to protect by Letters Patent is:

1. A process of reclaiming scrap containing vulcanized polychloroprene which comprises heating the same while in a sub-divided condition at a temperature from about 300° F. to about 420° F. in the presence of a sugar.

2. A process of reclaiming scrap containing vulcanized polychloroprene which comprises heating the same while in a sub-divided condition at a temperature from about 300° F. to about 420° F. in the presence of material from the group consisting of sugars and starches.

3. A process of reclaiming scrap containing vulcanized polychloroprene which comprises heating the same while in a sub-divided condition at a temperature from about 300° F. to about 420° F. in the presence of a polysaccharose.

4. A process of reclaiming scrap containing vulcanized polychloroprene which comprises heating the same while in a sub-divided condition at a temperature from about 300° F. to about 420° F. in the presence of a disaccharose.

5. A process of reclaiming scrap containing vulcanized polychloroprene which comprises heating the same while in a sub-divided condition at a temperature from about 300° F. to about 420° F. in the presence of sucrose.

6. A process of reclaiming scrap containing vulcanized polychloroprene which comprises heating the same while in a sub-divided condition at a temperature from about 300° F. to about 420° F. in the presence of a monosaccharose.

7. A process of reclaiming scrap containing vulcanized polychloroprene which comprises heating the same while in a sub-divided condition at a temperature from about 300° F. to about 420° F. in the presence of glucose.

8. A process of reclaiming scrap containing vulcanized polychloroprene which comprises heating the same while in a sub-divided condition at a temperature from about 300° F. to about 420° F. in the presence of a starch convertible to a sugar during the reclaiming operation.

9. A process of reclaiming scrap containing elastic polychloroprene which comprises heating the same while in a sub-divided condition at an elevated temperature from about 300° F. to about 420° F. in the presence of a sugar and for a time sufficient to reduce the elastic polychloroprene to a plastic state where it has a Mooney viscosity substantially less than 200 when tested at 180° F.

10. A process of reclaiming scrap containing elastic polychloroprene which comprises heating the same while in a sub-divided condition at an elevated temperature in the presence of a sugar and for a time sufficient to reduce the elastic polychloroprene to a plastic state where it has a Mooney viscosity substantially less than 200 when tested at 180° F.

11. A process of reclaiming scrap containing elastic polychloroprene which comprises heating the same while in a sub-divided condition at an elevated temperature in the presence of material from the group consisting of sugars and starches and for a time sufficient to reduce the elastic polychloroprene to a plastic state where it has a Mooney viscosity substantially less than 200 when tested at 180° F.

12. A process of reclaiming scrap containing elastic polychloroprene which comprises heating the same while in a sub-divided condition at an elevated temperature in the presence of a polysaccharose and for a time sufficient to reduce the elastic polychloroprene to a plastic state where it has a Mooney viscosity substantially less than 200 when tested at 180° F.

13. A process of reclaiming scrap containing elastic polychloroprene which comprises heating the same while in a sub-divided condition at an elevated temperature in the presence of a disaccharose and for a time sufficient to reduce the elastic polychloroprene to a plastic state where it has a Mooney viscosity substantially less than 200 when tested at 180° F.

14. A process of reclaiming scrap containing elastic polychloroprene which comprises heating the same while in a sub-divided condition at an elevated temperature in the presence of sucrose and for a time sufficient to reduce the elastic polychloroprene to a plastic state where it has a Mooney viscosity substantially less than 200 when tested at 180° F.

15. A process of reclaiming scrap containing elastic polychloroprene which comprises heating the same while in a sub-divided condition at an elevated temperature in the presence of a monosaccharose and for a time sufficient to reduce the elastic polychloroprene to a plastic state where it has a Mooney viscosity substantially less than 200 when tested at 180° F.

16. A process of reclaiming scrap containing elastic polychloroprene which comprises heating the same while in a sub-divided condition at an elevated temperature in the presence of glucose and for a time sufficient to reduce the elastic polychloroprene to a plastic state where it has a Mooney viscosity substantially less than 200 when tested at 180° F.

17. A process of reclaiming scrap containing elastic polychloroprene which comprises heating the same while in a sub-divided condition at an elevated temperature in the presence of a starch and for a time sufficient to reduce the elastic polychloroprene to a plastic state where it has a Mooney viscosity substantially less than 200 when tested at 180° F.

WALTER G. KIRBY.
LEO E. STEINLE.